United States Patent [19]
Karpisek

[11] 4,185,546
[45] Jan. 29, 1980

[54] COOKING APPARATUS

[75] Inventor: Ladislav S. Karpisek, Sydney, Australia

[73] Assignee: Zeus Industries Pty. Limited, Naringbah, Australia

[21] Appl. No.: 920,487

[22] Filed: Jun. 29, 1978

[51] Int. Cl.² .............................................. A47J 37/08
[52] U.S. Cl. ........................................ 99/386; 99/400
[58] Field of Search ................. 99/386, 387, 372, 373, 99/389, 400

[56] References Cited
U.S. PATENT DOCUMENTS

| | | | |
|---|---|---|---|
| 1,477,343 | 12/1923 | Griffin | 99/386 |
| 2,465,577 | 3/1949 | Cox | 99/400 |
| 2,549,375 | 4/1951 | Goddard | 99/386 |
| 3,487,770 | 1/1970 | Svenson | 99/387 X |

*Primary Examiner*—Edward J. McCarthy

[57] ABSTRACT

A toaster including a cooking chamber with upper and lower heating elements. A conveyor of the walking beam type to transfer articles to be cooked through the cooking chamber between the elements is provided. The conveyor comprises a non-moving grid and a moving grid, the arrangement being such that the advance of each article to be cooked is such that at each advance the article comes to rest on the non-moving grid at a position different to that which engaged the non-moving grid prior to that advance movement.

8 Claims, 6 Drawing Figures

COOKING APPARATUS

BACKGROUND OF THE INVENTION

This invention relates to cooking apparatus and more particularly to apparatus for toasting articles such as a slice of bread. Hereinafter for convenience the apparatus will be referred to as a toaster and the product will be called toast.

The present invention has for its object the provision of toast which when discharged from the toaster is of uniform toasted texture. This is not possible with a number of existing toasting machines where the toast is conveyed through a toasting area on top of a stationary grid, with bars in the direction of toast travel. Such apparatus produces a toast with burn lines due to extended contact with the metal bars on which the toast rests while it is conveyed through the toaster. Such stripes provide an unacceptable appearance to the toast and accordingly it is the prime object of this invention to provide a toaster which yields toast on which no such burn lines appear and the toasted surface is substantially uniform in colour.

SUMMARY OF THE INVENTION

A toaster according to the invention comprises a base housing an exposed heating element, a lid housing an exposed heating element and mounted on the base with the elements in spaced apart overlying relationship, a walking beam conveyor to transport articles to be toasted by the elements between the two heating elements, the conveyor comprising a first stationary grid made up of a plurality of parallelly spaced bars and a moving grid made up of a plurality of parallelly spaced bars, the grids have similar arrangements of bars and at least portions of the bars are angled to the direction of conveying, grid advancing means supporting the moving grid and drivingly connected thereto, to raise and advance the moving grid while raised and lower the moving grid between the bars of the stationary grid and retract the moving grid, the distance of advance of the moving grid being less than the pitch between the portions of adjacent bars of the stationary grid angled to the direction of conveying.

The invention in a presently preferred form as described hereinafter with reference to the accompanying drawings in which:

DESCRIPTION OF THE INVENTION

Figure 1:
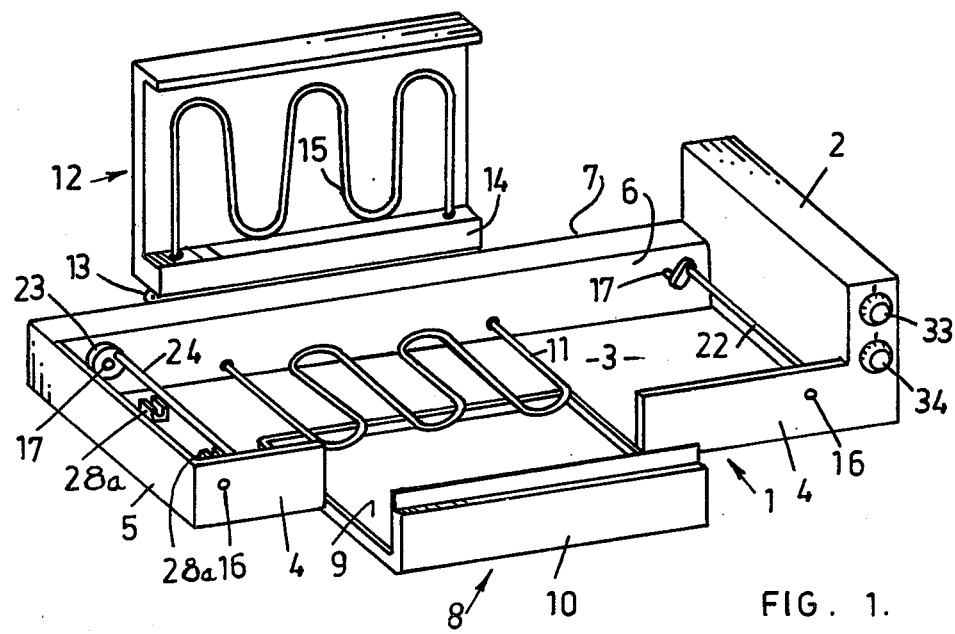
FIG. 1 is a perspective view of the toaster with the lid raised, the crumb drawer partly opened and the toast conveying grids removed (in the interest of clarity)
Figure 2:
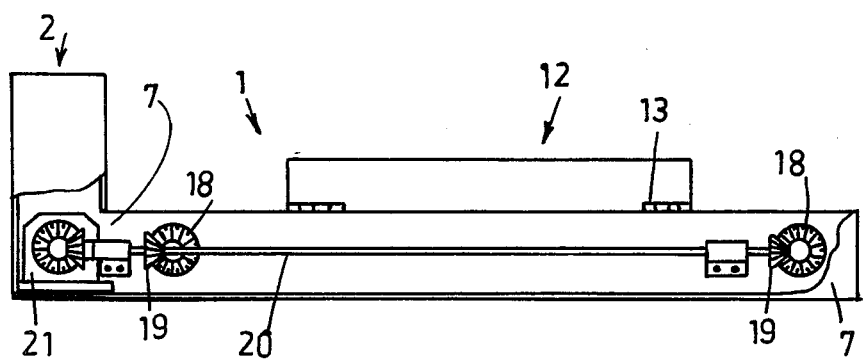
FIG. 2 is a perspective view of the stationary and movable grids used to convey articles through the toaster.
Figure 3:
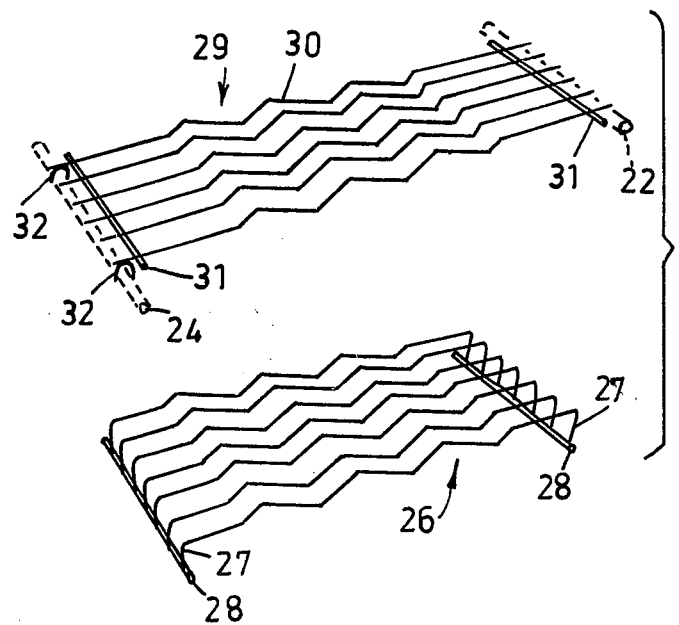
FIG. 3 is a rear elevation of the toaster with part of a back panel removed to show the drive for the article conveying grid.

As illustrated the toaster comprises a lower part 1 including a control box end panel 2, a bottom 3, an interrupted two part front side 4, a discharge end 5, an inner back panel 6 and an outer back panel 7. Slidably mounted on the bottom 3 is a drawer 8 having a tray bottom 9 and a front 10 which combines with the parts of the front side 4 to close in the front of the toaster.

A heating element 11 is end connected to the inner back panel 6 and extends over the drawer tray bottom 9.

A lid 12 is hinged as at 13 to the outer back panel 7 so as to be closable over the drawer 8. The width of the lid 12 is such that there is a space between an edge of the lid and the control box end panel 2 and a space between the other side of the lid and the discharge end 5. The former space provides a loading position for bread to be toasted onto a conveying grid and the latter space providing a position for removing slices of bread after toasting. At the rear of the lid 12 is a housing 14 for electric connections to a heater element 15 mounted on the housing 14.

At each end of the housing lower part is a transverse grid supporting and advancing assembly. Each assembly has a first stub axle 16 end supported in known manner in bearings on the inner face of the parts of the front side 4. Each assembly has a second stub axle 17 aligned with its first stub axle 16 and extending through bearings on the inner back panel 6. Each stub axle 17 has a bevel gear 18 fixed thereto and the bevel gears of the stub axle 18 engage with mating bevel gears 19 on a shaft 20 rotatably mounted on the inner back panel 6 so as to lie between the inner and outer back panels 6 and 7. The shaft 20 extends into the control box end panel 2 where it is connected to drive means which may include speed regulating means in the form of a variable speed motor or a variable speed clutch indicated diagramatically as 21.

The stub axles 16 and 17 of one grid supporting and advancing assembly are fixed to arms joined by a bar 22. The axis of the bar 22 is eccentric to the common axes of the stub axles 16 and 17 and is parallel thereto. The stub axles 16 and 17 of the other grid supporting and advancing assembly are fixed centrally to discs 23 and the discs are joined by a bar 24. The axis of the bar 24 is parallel to its stub axes and has the same eccentricity relative to its stub axles as the transverse bar 22 has to its stub axles 16 and 17.

Two grids are provided. The first grid is a nonmoving grid made up of seven similar zig-zag bars 26 with downturned ends 27 and tie bars 28 to secure the ends 27 together. The stationary grid is located between the arcs of travel of the bars 22 and 24 so as not to foul the bars 22 and 24 as they rotate. The stationary grid is longitudinally positioned by engagement of the bar 28 in two U-sockets 28a on the bottom 3 and is laterally located by projecting ends of the bars 28 which lie adjacent the inner back panel 6 and the parts of the front side 4.

Figure 5:
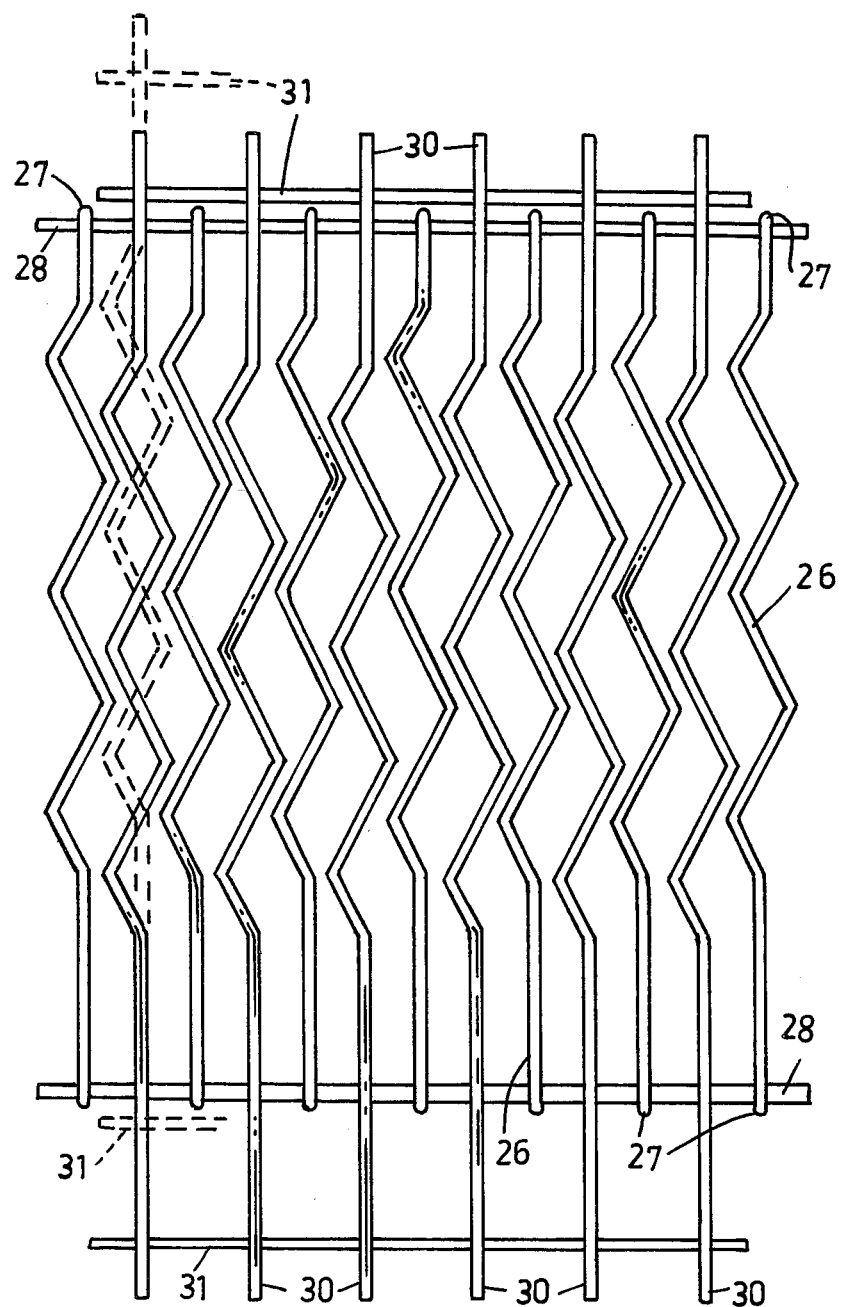
FIG. 5 is a plan view of the grid shown in FIG. 4

A second moving grid 29 comprises six zig-zag bars 30 tied together by cross bars 31. Yokes 32 on one end of the bars 30 of the grid 29 engage over the bar 24. The other ends of the bars 30 of the grid 29 rest on the bar 22. The proportioning of the grids, spacing of the bars and the pitch of the zig-zags is such that the grids appear as shown in full and dotted lines in FIG. 5 for the two extreme positions movement of the grid 29.

Figure 4:
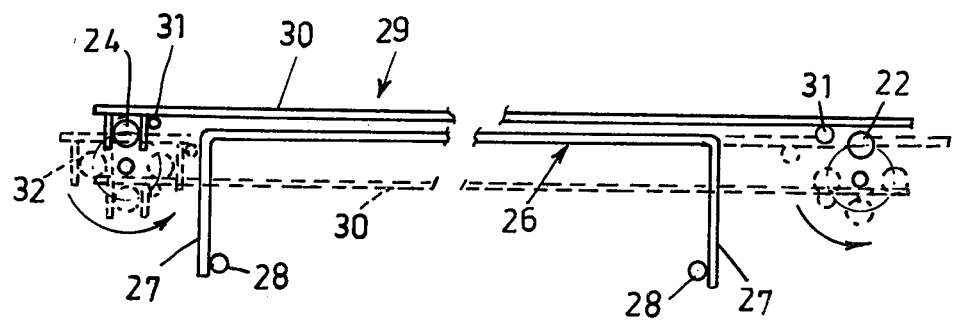
FIG. 4 is a schematic view showing the grids in various positions during the article conveying operation.

It is to be noted that the relative vertical heights of the top of the stationary grid, the axes of the stub axles 16-17 and the eccentricity of the bars 22-24 is such that the moving grid will move forward, then downward, then rearward and then upward in a continuous manner by the engagement of the yokes 32 with the bar 24 with the bars 30 passing up and down between the bars 26 to achieve a "walking beam" type advance of slices of toast through the toasting area (below the lid 12). At each rest (bars 30 below bars 26) the bread is supported on the bars 26, at each advance (bars 30 above bars 26) the toast is supported by the bars 30. This can be seen from FIG. 4.

It is important that the advance of the moving grid (the stroke as determined by the eccentricity of bars 22–24) is made different from the pitch of the bars, the pitch of the bars of both grids, however, being the same. It follows that at each lowering of a piece of toast onto the stationary grid the portions of the toast previously engaging the bars of the stationary grid will not again align therewith until such time as the sum of the distances advanced by the piece of toast is equal to a multiple of the pitch of the bars. In this way a substantially uniform toasted texture is given to the toast without burn lines due to continued contact of the same regions of the toast with the hot grid bars. It can be arranged, as will be understood and should it be required, by selection of the various factors to ensure that the same portion of the toast surface will never engage the bars of the stationary grid more than once in travelling through the device.

The heating elements 11 and 15 can be varied as to heat output as required by any one of a number of known controls housed in the control box end panel 2 and regulated by, for example, manipulation of the knob 33. Likewise the speed of the motor 21 driving the shaft 20 can be varied by, for example, manipulation of the knob 34. The manipulation of knob 34 may act to regulate the speed of a driving motor 21 or regulate the operation of a variable speed output drive assembly. These aspects do not form any inventive part of this specification.

Additionally, if required, the heating elements 15 contained in the lid 12 may be mounted so as to be vertically movable. By all the foregoing means it is possible to "set-up" the machine to provide ideal toasting conditions for thicknesses and qualities of bread as may be required to be processed by the machine.

Figure 6:
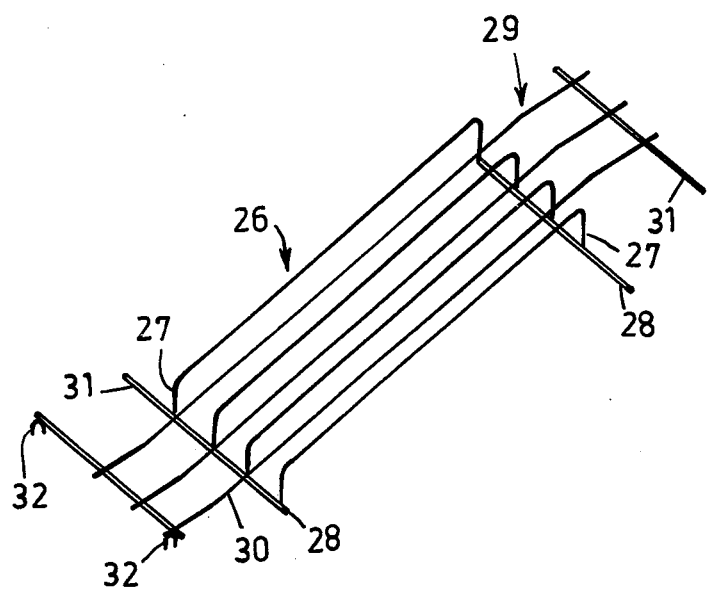
FIG. 6 is a schematic view of one alternate form of the grids.

FIG. 6 shows an alternate form of grid. It is to be noted that the spacing of the bars of grid 26 is such that the bars 30 can move in the required manner as explained previously.

What is claimed is:

1. A toaster comprising a base housing an exposed heating element, a lid housing an exposed heating element and mounted on the base with the elements in spaced apart overlying relationship, a walking beam conveyor to transport articles to be toasted by the elements between the two heating elements, the conveyor comprising a first stationary grid made up of a plurality of parallelly spaced bars and a moving grid made up of a plurality of parallelly spaced bars, the grid having similar arrangements of bars and at least portions of the bars being angled to the direction of conveying, grid advancing means supporting the moving grid and drivingly connected thereto, to raise said moving grid and advance it while in a raised position, and to lower said moving grid between the bars of the stationary grid and retract it while in a lowered position, the distance of advance of the moving grid being less than the pitch between the portions of adjacent bars of the stationary grid angled to the direction of conveying.

2. A toaster as claimed in claim 1 wherein the grid advancing means includes a pair of eccentric shafts transverse to the direction of conveying and at least one of which engages yokes at or near one end of the moving grid.

3. A toaster as claimed in claim 1 or claim 2 wherein each bar of each grid includes two end portions in the direction of conveying and an intermediate portion of zig-zag configuration.

4. A toaster as claimed in claim 1 or claim 2 wherein the stationary grid comprises straight bars at an acute angle to the direction of conveying and the moving grid comprises similarly directed bars with end portions in the direction of conveying.

5. A toaster as claimed in claim 2 wherein the yokes are inverted U-sections at one end of the moving grid.

6. A toaster as claimed in claim 2 wherein the grid advancing means comprises a pair of parallel shafts transverse to the direction of conveying, the shafts are each end mounted on carriers secured to a pair of axially aligned stub axles with respect to which the shafts are eccentric, one stub axle of each pair is connected to drive means to cause the stub axles to rotate.

7. A toaster as claimed in claim 6 wherein the speed of rotation of the stub axles can be varied.

8. A toaster as claimed in claim 1 wherein the heat of the heating element can be adjusted.

* * * * *

UNITED STATES PATENT AND TRADEMARK OFFICE
CERTIFICATE OF CORRECTION

PATENT NO. : 4,185,546
DATED : January 29, 1980
INVENTOR(S) : Ladislav Stephan Karpisek It is certified that error appears in the above-identified patent and that said Letters Patent are hereby corrected as shown below:

Claim 1, column 4, line 9, "grid" should be --grids--.

Signed and Sealed this

Fifteenth Day of July 1980

[SEAL]

Attest:

SIDNEY A. DIAMOND

Attesting Officer

Commissioner of Patents and Trademarks